United States Patent
Viswanathan Pillai et al.

(12) 
(10) Patent No.: US 10,725,742 B2
(45) Date of Patent: Jul. 28, 2020

(54) TRANSCENDENTAL FUNCTION EVALUATION

(71) Applicant: Texas Instruments Incorporated, Dallas, TX (US)

(72) Inventors: Prasanth Viswanathan Pillai, Bangalore (IN); Richard Mark Poley, Sugar Land, TX (US); Venkatesh Natarajan, Bangalore (IN); Alexander Tessarolo, Lindfield (AT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 126 days.

(21) Appl. No.: 16/000,736

(22) Filed: Jun. 5, 2018

(65) Prior Publication Data
US 2019/0369962 A1    Dec. 5, 2019

(51) Int. Cl.
*G06F 7/548*    (2006.01)

(52) U.S. Cl.
CPC ................................ *G06F 7/548* (2013.01)

(58) Field of Classification Search
CPC .................................. G06F 1/03; G06F 7/556
USPC .......................................................... 708/277
See application file for complete search history.

(56) References Cited

U.S. PATENT DOCUMENTS

| | | | |
|---|---|---|---|
| 8,346,831 B1* | 1/2013 | Cai | G06F 1/0356 708/233 |
| 9,465,580 B2* | 10/2016 | Pineiro | G06F 1/02 |
| 2013/0091189 A1* | 4/2013 | Cai | G06F 1/0356 708/490 |
| 2014/0222883 A1* | 8/2014 | Pineiro | G06F 1/02 708/523 |
| 2015/0012578 A1* | 1/2015 | Cai | G06F 7/57 708/233 |
| 2018/0217814 A1* | 8/2018 | Zhong | G06F 7/556 |
| 2019/0138570 A1* | 5/2019 | Zhang | G06F 7/548 |

* cited by examiner

*Primary Examiner* — Tan V Mai
(74) *Attorney, Agent, or Firm* — Brian D. Graham; Charles A. Brill; Frank D. Cimino

(57) ABSTRACT

In described examples, an apparatus is arranged to generate a linear term, a quadratic term, and a constant term of a transcendental function with, respectively, a first circuit, a second circuit, and a third circuit in response to least significant bits of an input operand and in response to, respectively, a first, a second, and a third table value that is retrieved in response to, respectively, a first, a second, and a third index generated in response to most significant bits of the input operand. The third circuit is further arranged to generate a mantissa of an output operand in response to a sum of the linear term, the quadratic term, and the constant term.

20 Claims, 5 Drawing Sheets

TRANSCENDENTAL FUNCTION EVALUATION

BACKGROUND

A process for performing nonlinear control at high levels of performance can evaluate a transcendental function to generate a corrected error signal in a feedback control loop. The corrected error signal is produced in response to a control loop error. A function $|x|^\alpha$ is a transcendental function that generally uses substantial digital computation for its evaluation. In digital systems, such transcendental functions can be evaluated by determining a Taylor series expansion that consumes a high level of computing power and a substantial number of clock cycles for its execution. Hardware implementations for evaluation of transcendental functions have been proposed such as by using CORDIC (coordinate rotation digital computer), which is an iterative process that converges in accuracy during successive steps. Accordingly, the evaluation of a transcendental function such as $|x|^\alpha$ in a control loop can consume relative large amounts of power and time.

SUMMARY

In described examples, an apparatus is arranged to generate a linear term, a quadratic term, and a constant term of a transcendental function with, respectively, a first circuit, a second circuit, and a third circuit in response to least significant bits of an input operand and in response to, respectively, a first, a second, and a third table value that is retrieved in response to, respectively, a first, a second, and a third index generated in response to most significant bits of the input operand. The third circuit is further arranged to generate an output operand in response to a sum of the linear term, the quadratic term, and the constant term.

DETAILED DESCRIPTION

Figure 1:
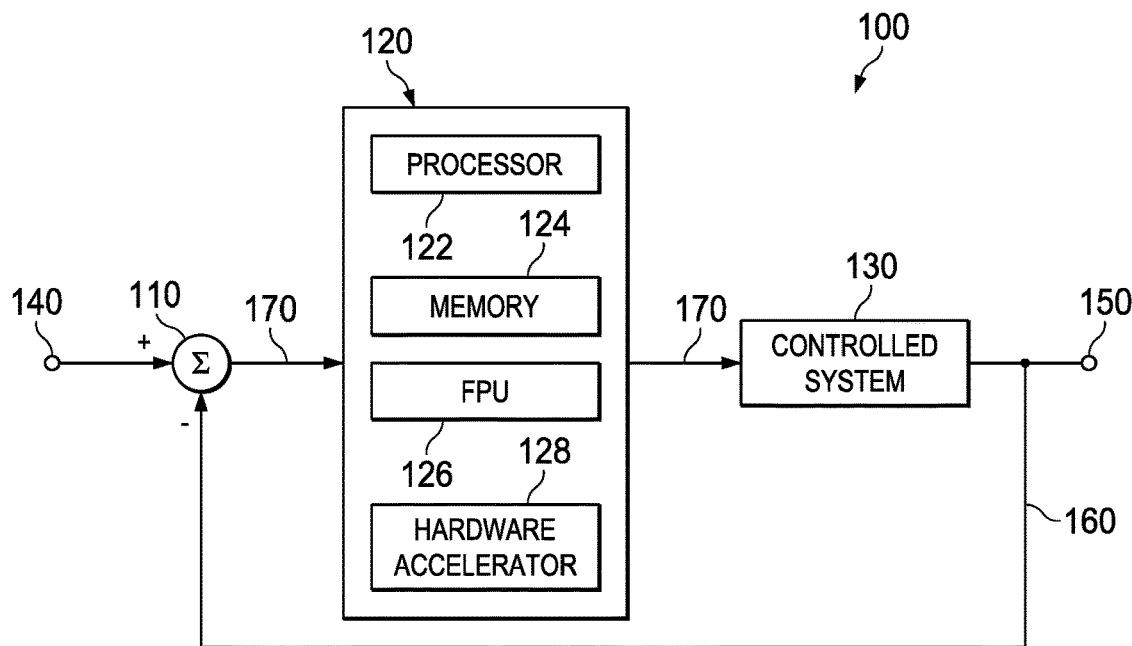
FIG. 1 is a block diagram of an example system including an example execution unit for determining transcendental functions.

A system is described herein for evaluating a transcendental function such as $|x|^\alpha$. The transcendental function can be evaluated in response to curve-fitting the transcendental function over a sequence of equally or non-equally spaced segments, where the segments for such curve-fitting are determined relative to a mantissa of an input operand, and the curve-fitting generates an approximation of a value of the transcendental function. Examples of digital circuitry (such as an execution unit and/or hardware accelerator) are described herein for evaluating transcendental functions (such as a logarithmic or an exponential function) in response to linear or quadratic curve-fitting.

An example execution unit can be arranged to evaluate a transcendental function by quickly evaluating functions otherwise performed by a general purpose processor executing software (which otherwise executes over longer periods of time). The execution unit can operate in conjunction with a processing unit such as floating point unit (FPU) to provide improved speed, accuracy and suitability for real-time control applications. The example execution unit described herein can be emulated, for example, with programmable logic circuits and provide speed, accuracy, and suitability for real-time control applications.

For evaluating a logarithmic function of an input value, an input floating-point number is segregated into the constituent mantissa and exponent parts. Linear and quadratic terms of the transcendental function can be evaluated in response to curve-fitting the mantissa. The linear and quadratic terms of the curve-fitting can be shifted and combined with exponent values determined in response to the input exponent. The mantissa can be left-shifted for cases in which the exponent is zero and the mantissa has leading zeros. The final result can be left-shifted left to generate a floating-point number in proper form that includes an adjusted exponent.

For evaluating an inverse exponential function (which is an exponential function) of an input value, a input floating-point number is segmented in response to a slope of the function determined by the input mantissa and exponent. Linear and quadratic terms of the transcendental function can be evaluated in response to curve-fitting the mantissa over non-equally spaced segments. The linear and quadratic terms are combined to form a final result. Final results for input values having points near zero are determined in response to more higher resolution x-value components (e.g., as compared to the resolution of very large input values) in a curve fit due to the floating-point representation. Spacing the segments (and selecting the number of segments) in response to a slope of the function determined by the input exponent maintains the cardinality of samples for a selected accuracy over the range of input values when evaluating the exponential function.

Accordingly, the example execution unit for evaluating transcendental functions can be included in a digital implementation of a system, such as a real-time feedback system, which substantially reduces the latency of the time period for calculating the result of a transcendental function.

In an example system described hereinbelow, the function $\log_2 |x|$ can be evaluated in six computer cycles to an accuracy of about $2^{-23}$ when referencing a table of 128 segments, whereas an example FPU executing software can evaluate the function in as few as 35 computer cycles. The example system can evaluate in seven computer cycles the function $2^{-|x|}$ to an accuracy of about $2^{-20}$ when referencing a table of 249 segments, whereas an example FPU executing software can evaluate in seven computer cycles the function in as few as 69 computer cycles. The example system can evaluate in eight computer cycles the function $\log_e |x| = \log_2 |x| * (1/(\log_2(e))$, whereas an example FPU executing software can evaluate the function in as few as 31 computer cycles. The example system can evaluate in nine computer cycles the function $e^x = 2^{x * \log_2(e)}$, whereas an example FPU executing software can evaluate the function in as few as 43 computer cycles. The level of accuracy and the reduced latency provides sufficiently accurate and timely numerical results for purposes of a real-time nonlinear control application. In other systems designed according to the techniques of this disclosure, various combinations of more, less, or the same number of cycles may be used for evaluating one or more of the above-mentioned functions.

In the example described hereinbelow, an FPU is coupled to an example execution unit and is arranged to provide a floating point number and an indication of an instruction type to the execution unit. The FPU is arranged to wait for six computer cycles for log function results, and seven computer cycles for inverse exponentiation function results. However, the FPU is pipelined, such that the FPU need not remain idle while awaiting results. Accordingly, the latency of the FPU is reduced, such that the FPU can more quickly regulate a nonlinear feedback loop, for example.

In some examples, the execution unit is arranged as at least two pipeline stages in which the second stage determines a second-portion of an evaluation for a first input operand while the first stage determines a first-half of an evaluation for a second input operand. Accordingly, the throughput of the example pipelined hardware-accelerated system can be doubled as compared to an otherwise similar example non-pipelined hardware-accelerated system.

FIG. 1 is a block diagram of an example system 100 including an example hardware accelerator for determining transcendental functions. For example, the system 100 includes a to-be-controlled system (also referred to as a "controlled system") 130. The system 100 includes a feedback path 160 for operating in response to output state signal 150 generated by the controlled system 130. The output state signal 150 is coupled to an inverting input of an adder 110 via the feedback path 160. The noninverting input of the adder 110 receives a target output state signal 140 that represents a target output state of the controlled system 130. In response to the output state signal 150 and the target output state signal, the adder 110 generates a state error signal 170 to be processed by a central processing unit (CPU) 120.

The CPU 120 includes a processor 122, memory 124, an FPU 126 and an execution unit 128 that generates a non-linearized state error signal 170 that is presented as a control input to the controlled system 130. The execution unit 128 is arranged to digitally compute the (e.g., non-linearized) state error signal 170. The state error signal 170 can be represented by a transcendental function $|x|^\alpha$, where x represents the state error signal 170 and a is a constant in a range that extends, for example, from 0.2 to 2.0. In such a manner, a non-linearized response of the controlled system 130 can be accurately generated by the execution unit 128. The processor 122 is arranged to generate an input operand for hardware accelerated calculation of a transcendental function, while the memory 124 is configured to receive and store the input operand. The execution unit 128 is arranged to generate as an approximation of a transcendental function in response to the input operand stored and retrieved from the memory 124.

Figure 2:
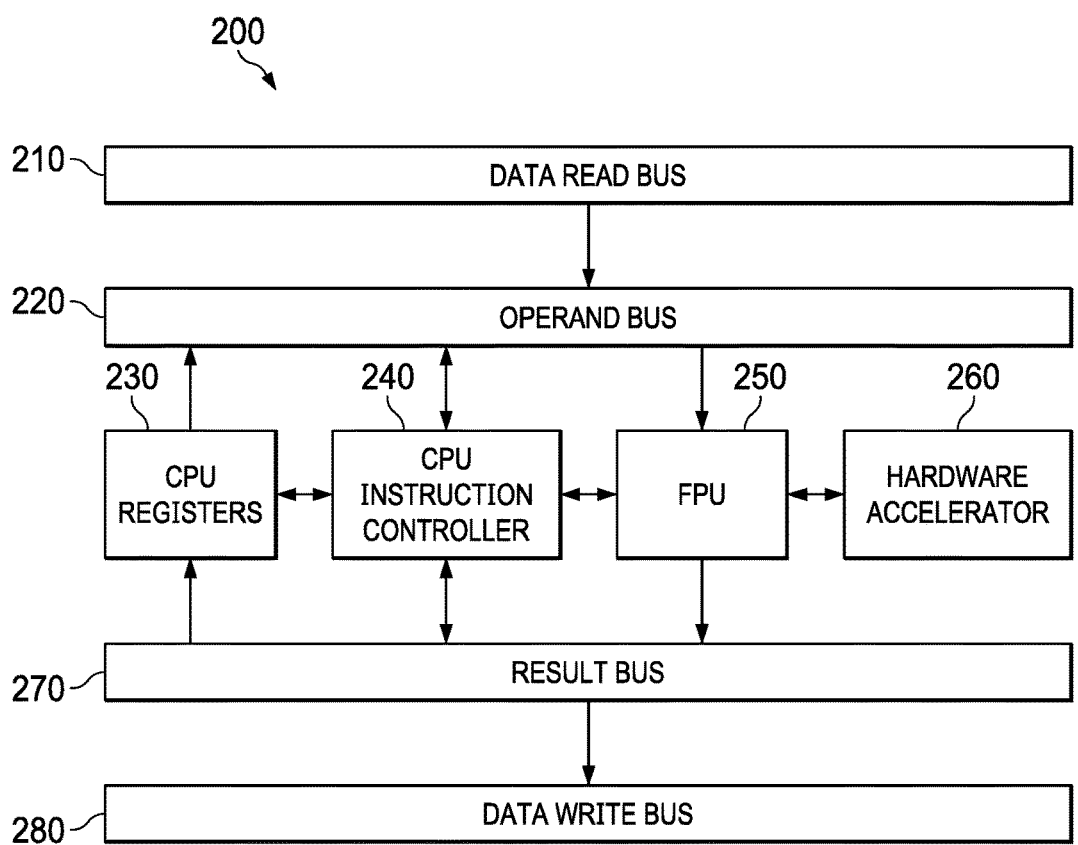
FIG. 2 is a block diagram of an example CPU including an example execution unit for determining transcendental functions.

FIG. 2 is a block diagram of an example CPU 200 including an example execution unit for determining transcendental functions. The CPU 200 can be a processor, such as the CPU 120. The CPU 200 includes an operand bus 220 coupled to receive data from a data read bus 210. The CPU 200 also includes a result bus 270 coupled to write data to a data write bus 280. Results of computation generated by the CPU 200 are asserted on the result bus 270.

The CPU 200 also includes an FPU 250 coupled (e.g., closely coupled) to an execution unit 260. The execution unit 260 (which can include a hardware accelerator and/or digital logic circuits as described further hereinbelow) is arranged to generate an approximation (e.g., close estimate) of a transcendental function result in response to an input operand stored and retrieved from register memory accessible by the FPU 250.

In an example multiplication operation not involving the execution unit, a "multiply" instruction is indicated to the FPU 250 by the CPU instruction controller 240. In response to the "multiply" instruction indication (and other control signals from the CPU instruction controller 240), the FPU 250 reads two floating-point numbers as input operands. The input operands can be stored in CPU registers 230 (and received by the FPU 250 via the data read bus 210) or received by the FPU 250 from external memory (via the data read bus 210 and the operand bus 220). In response to received operational codes (e.g., instructions), the CPU instruction controller 240 coordinates scheduling and execution of FPU-related instructions and operands between external memory, the CPU registers 230, and the FPU 250, for example.

Figure 3:
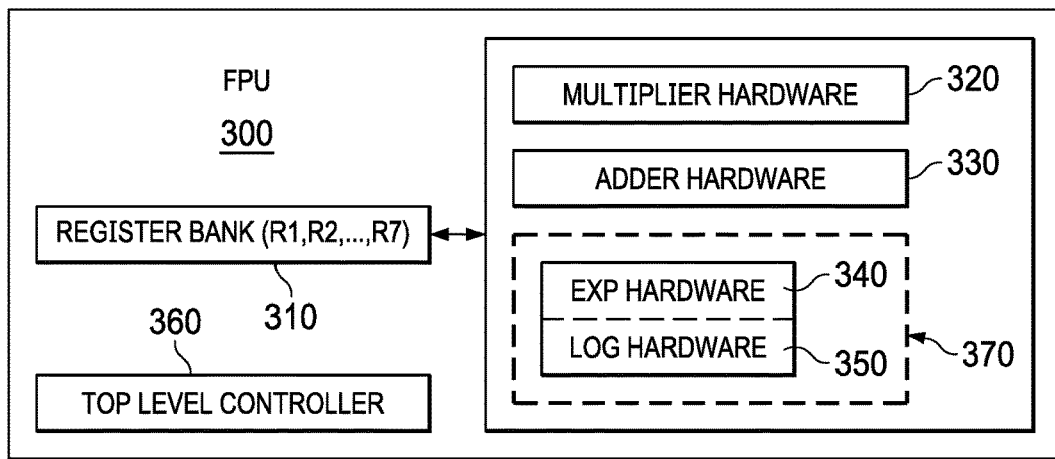
FIG. 3 is a block diagram of an example FPU including an example execution unit for determining transcendental functions.

FIG. 3 is a block diagram of an example FPU 300 including an example execution unit for determining transcendental functions. The FPU 300 can be a processor, such as the FPU 250. The FPU 300 includes an execution unit 370 arranged as a co-processor (e.g., with respect to a processor such as CPU 200). A register bank 310 (such as R1, R2, . . . , R7) is configured as a scratch-pad memory. The FPU 300 includes multiplier hardware 320 and adder hardware 330, which is arranged to execute floating-point arithmetic operations.

The FPU 300 includes the execution unit 370. The execution unit 370 is arranged to evaluate, at least, exponential and logarithmic transcendental functions. The execution unit 370 includes exponential hardware (EXP hardware) 340 that is arranged to evaluate exponential functions (including inverse exponential functions) and also includes logarithmic hardware (LOG hardware) 350 that is arrange to evaluate logarithmic functions.

A top-level controller 360 of the FPU 300 executes instructions in response to clocked operation of a state machine that is arranged to execute opcodes. For example, the top-level controller 360 generates and outputs bus control signals during a clock cycle for transferring information in response to a opcode received during a previous clock cycle. The top-level controller 360 can also operate in response to its own previous output. The FPU 300 is coupled to the execution unit 370, such that the FPU 300 and execution unit 370 are arranged to execute instructions (e.g., transcendental functions) more (e.g., much more) quickly than the FPU 300 could execute alone the same instruction (e.g., using firmware-encoded algorithms to sequence the operation of adders and multipliers).

Figure 4:
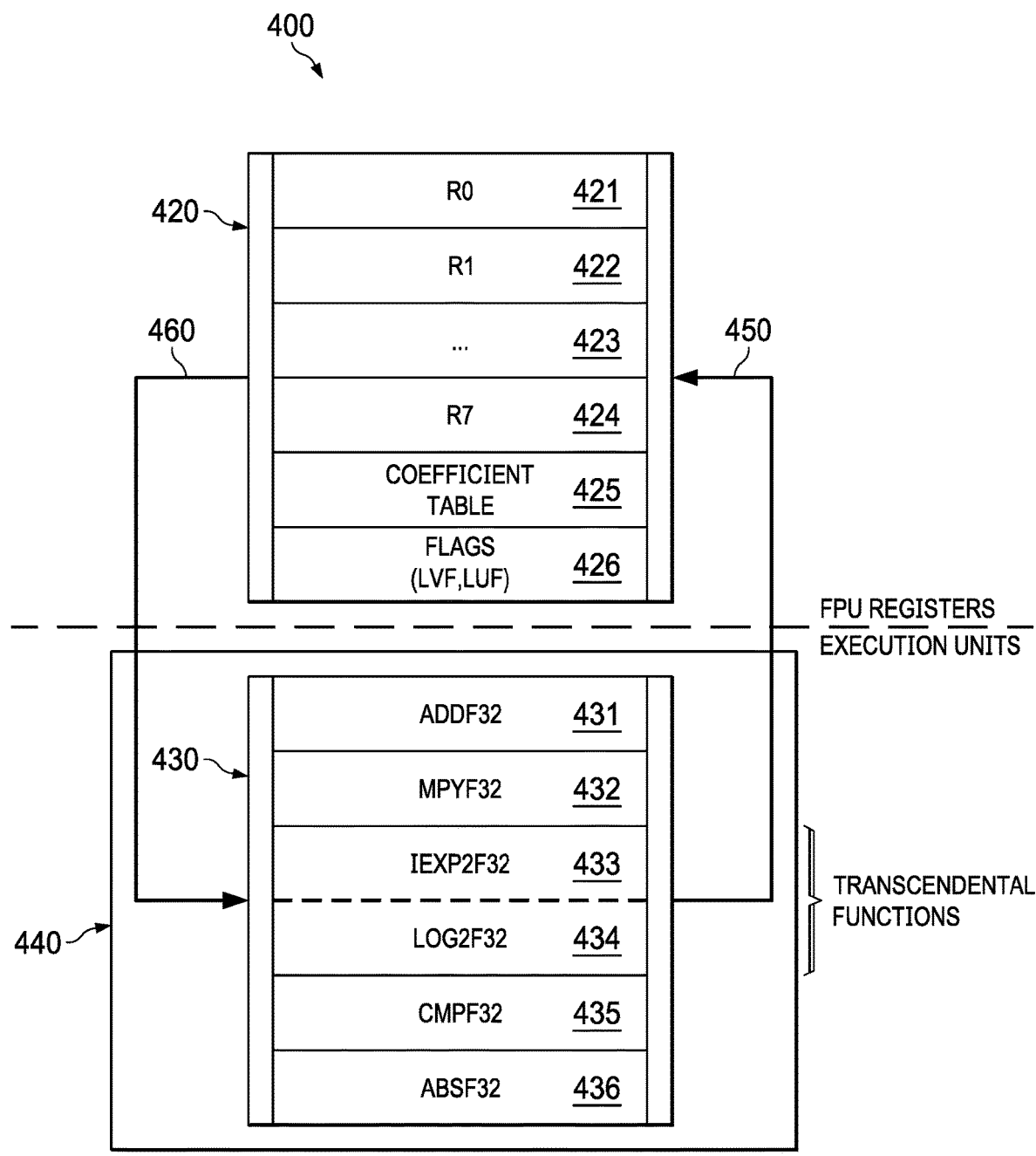
FIG. 4 is a block diagram of registers of example execution units for determining transcendental functions.

FIG. 4 is a block diagram of registers and example registers of execution units for determining transcendental functions. The programming model 400 can include registers 420 of an FPU (which can be a processor such as the FPU 300) and registers 430 of execution units 440 (which can be an accelerator such as the execution unit 370). In the architecture described herein, the FPU is closely coupled to the execution units 440, which facilitates transfer of operands to and from the execution units 440.

The registers 420 (e.g., that form a portion of the FPU) can include latches and/or flip-flops for accessibly storing digital information. The registers 420 include registers R0, R1, . . . , R7 (respectively designated 421, 422, 423, and 424), a coefficient table 425, and flags 426 such as a flag LVF (overflow flag) and flag LUF (underflow flag). The flags 426 can indicate an underflow or an overflow condition encountered as a result of a computation executed by the FPU in response to a received operand. The registers 420 are used to store information for relatively quick internal (as compared to external memory, for example) access by the FPU.

A data bus 460 is a data read bus (from the perspective of the execution units 440) by which information (such as operands) stored in an FPU register (such as registers 420) can be read and stored in selected registers (e.g., at least one register 431, 432, 433, 434, 435, or 436) of the execution units 440. The data bus 450 is a data write bus (from the perspective of the execution units 440) by which selected registers of the execution unit registers 430 can be accessed and stored in at least one selected register of the FPU registers 420. The execution units 440 includes circuits (e.g., dedicated hardware) for evaluating a selected mathematic function that can be executed in hardware more quickly than a general purpose processor executing instructions for evaluating the respective mathematic function, for example.

The execution units 440 includes registers 430 arranged to store input and/or output operands for underlying execution units. The registers 430 are arranged to read and write (e.g., mathematic function input and/or output) operands, such as ADDF32 operands (32-bit floating point addition operands) 431, MPYF32 operands (32-bit floating point multiplication operands) 432, CMPF32 opcode (32-bit floating point comparator operands) 435, and ABSF32 operands (32-bit floating point absolute value operands) 436.

Additionally, the execution units 440 includes registers for accessibly storing operations for accelerating evaluations for transcendental operations. For example, 32-bit operands for floating point exponentiation (IEXP2F32) can be read into and/or written from IEXP2F32 register 433, and 32-bit operands for floating point base-2 logarithms (LOG 2F32) can be read into and/or written from LOG 2F32 register 434. The registers 433 and 444 are closely coupled to dedicated circuitry (such as a high-speed floating integer exponent engine and a floating logarithmic engine, respectively) of the execution units 440.

In an example IEXP2F32 operation, the execution units 440 can read an input operand via the data bus 460 from the registers 420, such that the input operand is stored in the register 433. The FPU can execute no-op opcodes, when not pipelined for example, to account for the time for the execution units 440 used by the execution units 440 to evaluate the exponential function. After the execution units 440 has evaluated the exponential of the input operand and has stored the output operand (e.g., result) in the register 433, the execution unit 440 writes the contents of the register 433 (via the data write bus 450) to the FPU, such that the FPU obtains the exponentiation results generated by the execution units 440.

In an example LOG 2F32 operation, the execution units 440 can read an input operand on via data bus 460 from the registers 420, such that the input operand is stored in the register 434. The FPU can execute no-op opcodes, when not pipelined for example, to account for the time for the execution units 440 used by the execution units 440 to evaluate the logarithmic function. After the execution units 440 has evaluated the logarithm of the input operand and has stored the output operand (e.g., result) in the register 434, the execution unit 440 writes the contents of the register 434 (via the data write bus 450) to the FPU, such that the FPU obtains the logarithmic results generated by the execution units 440.

In examples, the registers 432 and 433 can each store both the input and output operands (e.g., at a same time). Additionally, the registers 432 and 433 can each be arranged (e.g., duplicated) to store one or both of the input/output operands for overlapping, pipelined execution of two same-type (e.g., both exponentiation or both logarithmic) or different-type (e.g., one exponentiation and one logarithmic) transcendental functions.

Figure 5:
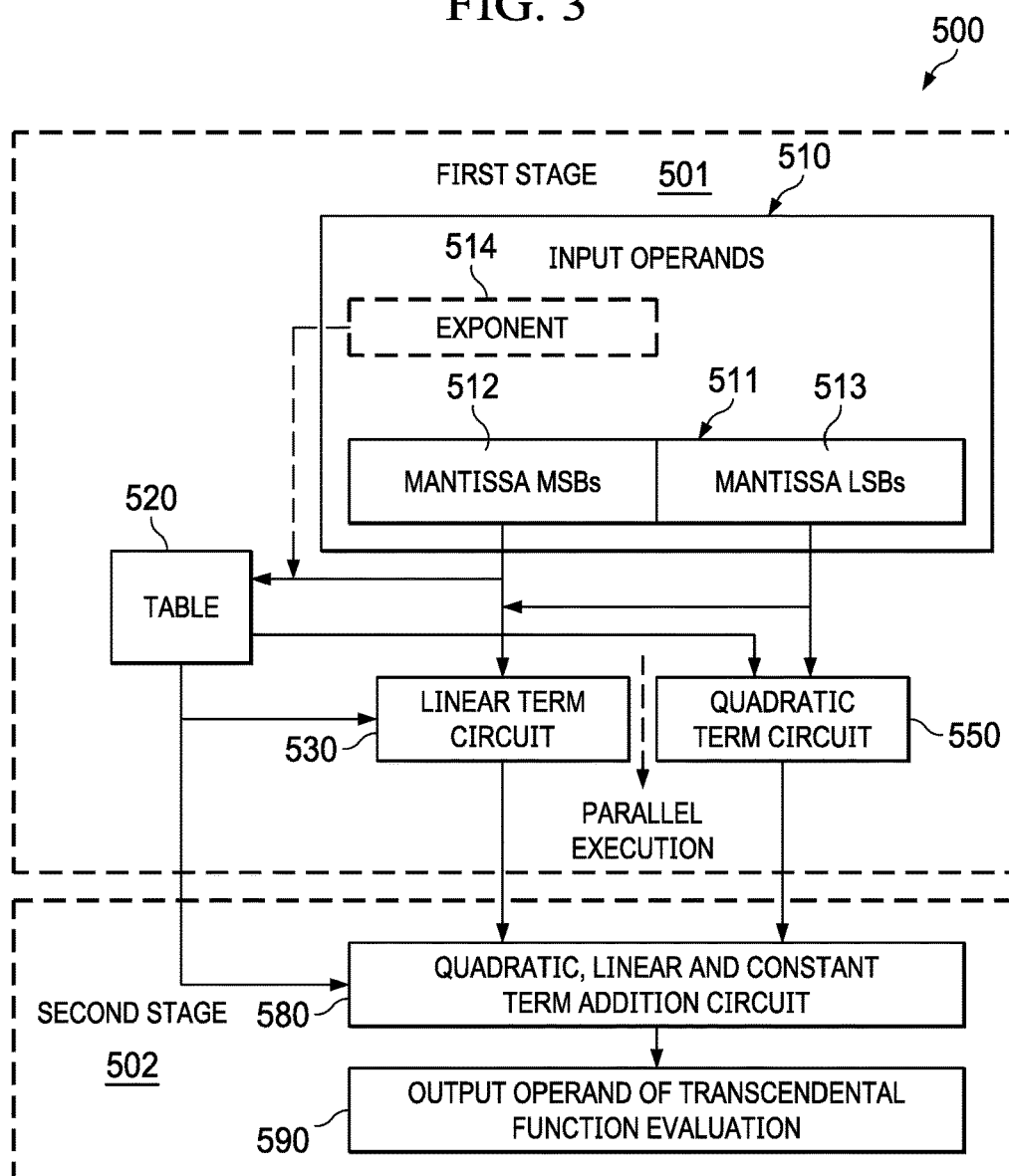
FIG. 5 is a high-level block diagram of an example execution unit for determining transcendental functions.

FIG. 5 is a high-level block diagram of an example execution unit for determining transcendental functions. The circuit 500 is an accelerator, such as the execution units 440 described hereinabove. The circuit 500 is arranged to determine a value (e.g., estimated value) of a transcendental function, such as a logarithmic function or an exponential function. The type of transcendental function to be performed can be determined in response to the register in which the input operand is stored. The transcendental calculation is approximated with a quadratic curve-fitting operation, in which a quadratic equation of the form $a*x^2 + b*x + c$ is evaluated over a segment of values in response to the input operand x.

The circuit 500 is operable as an execution unit configured to receive data from registers of an FPU and write data into the registers of the FPU. The circuit 500 and the FPU can be arranged to produce a non-linearized state error signal for controlling a system in response to (e.g., determining a difference between) an output state of the system and a target output state.

For example, the circuit 500 receives an input operand 510. The input operand 510 can be a floating point number, such that in the input operand 510 includes a mantissa 511, an exponent 514, and sign bits. The mantissa 511 includes (e.g., a set of) mantissa most significant bits (MSBs) 512 and (e.g., a set of) mantissa least significant bits (LSBs) 513. (The MSBs and the LSBs respectively are not necessarily the bits of the highest order or bits of the lowest order that are available: accordingly the term "most significant bits" can mean "more significant bits" and the term "least significant bits" can mean "less significant bits.") The circuit 500 is configured to receive the input operand 510, which can be read from a register of the FPU. The circuit 500 is configured to generate a result in response to the input operand 510 and to write an output operand 590 into the registers of the FPU. The result is generated by evaluating (e.g., estimating) a quadratic equation in response to the input operand. In various examples, differing numbers of bits (and formats of real numbers) of input operands can be used in accordance with speed of calculation, complexity of circuitry, accuracy of output values, and combinations thereof.

A first circuit 530 is arranged to generate a linear term (e.g., "$b*x$") of the transcendental function for curve-fitting. The linear term is generated in response to selected LSBs 513 of the mantissa 511 of the input operand 510 and in response to a first table value that is retrieved from a table(s) 520 in response to a first index generated in response to selected MSBs 512 of the mantissa 511. When the transcendental function being evaluated is an exponential function, the first index is also determined in response to the exponent 514.

A second circuit 550 is arranged to generate a quadratic term (e.g., "$a*x^2$") of the transcendental function for curve fitting. The quadratic term is generated in response to selected LSBs 513 of the mantissa 511 of the input operand 510 and in response to a second table value that is retrieved from a table(s) 520 in response to a second index generated in response to the MSBs 512 of the mantissa 511 of the input operand 510. When the transcendental function being evaluated is an exponential function, the second index is also determined in response to the exponent 514.

A third circuit 580 is arranged to generate (e.g., to output) a constant term (e.g., "c") and to combine the linear and quadratic terms generated by the first circuit 530 and the second circuit 550. The constant term is generated for the transcendental function for the curve fit in response to the linear and quadratic terms and in response to a third table value that is retrieved from a table(s) 520 in response to a third index generated in response to the MSBs 512 of the mantissa 511. When the transcendental function being evaluated is an exponential function, the third index is also determined in response to the exponent 514. Additionally, the third circuit 580 is arranged to generate a mantissa of the output operand 590 in response to a sum of the linear term, the quadratic term, and the constant term. The table(s) 520 can be a unified table, or can be separated into a first table, a second table and a third table.

In examples, the first and second circuits 530 and 550 are arranged for parallel execution (e.g., where the linear term and the quadratic term are each determined during respective time periods that overlap in time). The first and second circuits 530 and 550 can be arranged as a first stage 501 in a pipeline, and the third circuit 580 can be arranged as a second stage 502 in the pipeline, such that the second stage 502 can add the quadratic, linear, and constant terms of a first operand (e.g., to be evaluated by a first transcendental function) during a first time interval that overlaps in time a second time interval in which the first stage 501 is determining the linear and quadratic terms in response to a second operand (e.g., to be evaluated by a second transcendental function). The first stage 501 and the second stage 502 that are arranged in a pipeline configuration facilitate overlapping execution of successive operations, such that throughput can be doubled (e.g., after the pipeline is filled).

The circuit 500 is programmable to selectively generate the output operand 590 as either a logarithmic result or an exponentiated result in response to a command generated by an external processor such as the FPU. The third circuit can select one of the logarithmic and exponential functions in response to a decoded instruction, for example. The logarithmic function can be evaluated in response to curve-fitting of table values indexed in response to the mantissa, whereas the exponentiation function can be evaluated in response to a segmented curve-fitting approach in which the domain of values of a table is divided into segments (e.g., non-equally spaced segments) and the table is indexed in response to the curve-fitting of each indexed segment.

For the exponentiation function, a table (such as Table 2 described hereinbelow) includes sequences of non-equally spaced segments of values for approximating results of a the function in response to an index derived in response to the mantissa 511 and exponent 514. Of the input operand 510. The first table value retrieved from the first table in response to the first index, the second table value retrieved from the second table in response to the second index, and the third table value retrieved from the third table in response to the third index are values associated with endpoints of each of the non-equally spaced segments of the table of values. As an example, evaluation of the transcendental function $(|x|^\alpha)$ for different x and α values can be generated by determining intermediate values Z1 and Z2 from which to the final result $Z3=(|x|^\alpha)$ can be determined:

$$Z1=\log_2|x| \forall x \in [-\infty,\infty] \quad (1)$$

$$Z2=\alpha Z1 \forall Z1 \in (-\infty,0) \quad (2)$$

$$Z3=2^{-|Z2|} \forall Z2 \in (-\infty,\infty) \quad (3)$$

Accordingly, both logarithmic and exponential functions can evaluated in accordance with the intermediate values Z1, Z2, and Z3 determined for the transcendental function $(|x|^\alpha)$.

Evaluating transcendental functions (such as the exponential function $2^x$) can yield different accuracies for a given amount of computation. For example, the slope of the exponential function $2^x$ increases exponentially in response to a given increase in the x value. The density of floating point number is highest where x is near zero and the density decreases on either side of the number line as x diverges from the zero point. These two nonlinear effects cause the exponential function output to have a maximum density (e.g., a lesser range of y-values for a given range of x-values) around the zero point, and lower density (e.g., a greater range of y-values for a give range of x-values) further from the zero point. The curve-fitting techniques described herein for evaluating exponentiation functions maintain accuracy over the domain of values in response to curve-fitting values from non-equally spaced table segments, for example. The (e.g., ordinate) spacing between values in the domain of table values for curve-fitting is determined based on (e.g., the slope of the function of) the exponent at a point (e.g., for a given exponent value). Optimal (e.g., for a target application) spacing for each interval can be determined in response to least-mean-square analysis of a regression of interval spacing and table lengths to determine results of sufficient accuracy (e.g., cardinality) and table length (e.g., the number of indexed entries). Table 1 includes the number of entries in the table for each exponent in the range –18 to 5.

TABLE 1

| EXP | ENTRIES |
|---|---|
| –18 | 1 |
| –17 | 1 |
| –16 | 1 |
| –15 | 1 |
| –14 | 1 |
| –13 | 1 |
| –12 | 1 |
| –11 | 1 |
| –10 | 1 |
| –9 | 1 |
| –8 | 1 |
| –7 | 2 |
| –6 | 4 |
| –5 | 8 |
| –4 | 8 |
| –3 | 16 |
| –2 | 32 |
| –1 | 32 |
| 0 | 32 |
| 1 | 32 |
| 2 | 32 |
| 3 | 32 |
| 4 | 8 |
| 5 | 0 |

Example tables are set forth in Table 2 hereinbelow for evaluating the IEXP2F32 and LOG 2F32 functions. The coefficients for the curve-fit approach can be determined based on a least-mean-square approach.

The notation "IEXP2F32" and "LOG 2F32" in the example tables below represent the macro names of extended instructions (opcodes) for computing base-2, 32-bit floating-point exponential or logarithmic results. The table entries are represented as hexadecimal numbers. An "SL" is the slice/index number for accessing a table entry; Y0i is a constant value for a quadratic fit for the transcendental function; the terms "S1i" and the "S2i" are, respectively, the linear and quadratic term coefficients. In the example, Table 2 includes 249 slices, each of which can be accessed using an index that varies from 1 to 249. For a logarithmic table, the spacing of the slices (e.g., along the x-axis of the functions of Table 2) is constant, and for an exponential table, the spacing of slices (e.g., along the x-axis of the functions of Table 2) is variable.

TABLE 2

| SL NO: | Y0i | S1i | S2i |
|---|---|---|---|
| IEXP2F32 Tables | | | |
| 1 | 0xFFFFBD74 | 0x000B00 | 0x00000 |
| 2 | 0xFFFF7AEA | 0x001640 | 0x00000 |
| 3 | 0xFFFEF5D4 | 0x002C40 | 0x00000 |
| 4 | 0xFFFDEBAB | 0x0058C0 | 0x00000 |
| 5 | 0xFFFBD75B | 0x00B180 | 0x00000 |
| 6 | 0xFFF7AEC8 | 0x0162C0 | 0x00000 |
| 7 | 0xFFEF5DD7 | 0x02C580 | 0x00040 |
| 8 | 0xFFDEBCC4 | 0x058AC0 | 0x00100 |
| 9 | 0xFFBD7DDB | 0x0B1440 | 0x003C0 |
| 10 | 0xFF7B0CFF | 0x1622C0 | 0x00F40 |
| 11 | 0xFEF65F0A | 0x2C2E80 | 0x03D40 |
| 12 | 0xFE45E242 | 0x2C0FE0 | 0x03D20 |
| 13 | 0xFD95DFA5 | 0x2BF160 | 0x03D00 |
| 14 | 0xFCE656DE | 0x2BD300 | 0x03CC0 |
| 15 | 0xFC374798 | 0x2BB4B0 | 0x03CA0 |
| 16 | 0xFB88B180 | 0x2B9660 | 0x03C70 |
| 17 | 0xFADA9442 | 0x2B7840 | 0x03C40 |
| 18 | 0xFA2CEF8A | 0x2B5A28 | 0x03C18 |
| 19 | 0xF97FC304 | 0x2B3C20 | 0x03BF0 |
| 20 | 0xF8D30E5E | 0x2B1E38 | 0x03BC8 |
| 21 | 0xF826D144 | 0x2B0060 | 0x03BA0 |
| 22 | 0xF77B0B64 | 0x2AE298 | 0x03B78 |
| 23 | 0xF6CFBC6B | 0x2AC4E8 | 0x03B50 |
| 24 | 0xF624E407 | 0x2AA750 | 0x03B20 |
| 25 | 0xF57A81E5 | 0x2A89C8 | 0x03AF8 |
| 26 | 0xF47BCBBD | 0x54BB48 | 0x0EAF0 |
| 27 | 0xF329C922 | 0x544628 | 0x0E9A8 |
| 28 | 0xF1D999D8 | 0x53D1A0 | 0x0E868 |
| 29 | 0xF08B3B58 | 0x535DC0 | 0x0E728 |
| 30 | 0xEF3EAB20 | 0x52EA80 | 0x0E5E8 |
| 31 | 0xEDF3E6B1 | 0x5277D8 | 0x0E4A8 |
| 32 | 0xECAAEB8F | 0x5205D8 | 0x0E368 |
| 33 | 0xEB63B742 | 0x519470 | 0x0E230 |
| 34 | 0xEA1E4755 | 0x5123A8 | 0x0E0F8 |
| 35 | 0xE8DA9957 | 0x50B378 | 0x0DFC0 |
| 36 | 0xE798AADA | 0x5043E8 | 0x0DE8C |
| 37 | 0xE6587973 | 0x4FD4F0 | 0x0DD58 |
| 38 | 0xE51A02BA | 0x4F6690 | 0x0DC24 |
| 39 | 0xE3DD444B | 0x4EF8C8 | 0x0DAF4 |
| 40 | 0xE2A23BC7 | 0x4E8B9C | 0x0D9C8 |
| 41 | 0xE168E6CF | 0x4E1F04 | 0x0D898 |
| 42 | 0xE0314309 | 0x4DB300 | 0x0D76C |
| 43 | 0xDEFB4E1F | 0x4D4794 | 0x0D644 |
| 44 | 0xDDC705BC | 0x4CDCBC | 0x0D51C |
| 45 | 0xDC946790 | 0x4C7278 | 0x0D3F4 |
| 46 | 0xDB63714F | 0x4C08C8 | 0x0D2D0 |
| 47 | 0xDA3420AD | 0x4B9FA8 | 0x0D1AC |
| 48 | 0xD9067364 | 0x4B371C | 0x0D08C |
| 49 | 0xD7DA6730 | 0x4ACF20 | 0x0CF6C |
| 50 | 0xD6AFF9D1 | 0x4A67B0 | 0x0CE4C |
| 51 | 0xD5872909 | 0x4A00D2 | 0x0CD2E |
| 52 | 0xD45FF29D | 0x499A82 | 0x0CC12 |
| 53 | 0xD33A5457 | 0x4934C0 | 0x0CAF8 |
| 54 | 0xD2164C01 | 0x48CF8A | 0x0C9E0 |
| 55 | 0xD0F3D76C | 0x486AE0 | 0x0C8C8 |
| 56 | 0xCFD2F467 | 0x4806C0 | 0x0C7B4 |
| 57 | 0xCEB3A0CA | 0x47A32C | 0x0C6A0 |
| 58 | 0xCD95DA6A | 0x474022 | 0x0C58C |
| 59 | 0xCC799F23 | 0x46DDA0 | 0x0C47C |
| 60 | 0xCB5EECD3 | 0x467BA6 | 0x0C36C |
| 61 | 0xCA45C15A | 0x461A34 | 0x0C25E |
| 62 | 0xC92E1A9D | 0x45B948 | 0x0C150 |
| 63 | 0xC817F680 | 0x4558E4 | 0x0C046 |
| 64 | 0xC70352EF | 0x44F902 | 0x0BF3C |
| 65 | 0xC5F02DD6 | 0x4499A8 | 0x0BE34 |
| 66 | 0xC4DE8523 | 0x443AD0 | 0x0BD2C |

TABLE 2-continued

| SL NO: | Y0i | S1i | S2i |
|---|---|---|---|
| 67 | 0xC3CE56C9 | 0x43DC7A | 0x0BC26 |
| 68 | 0xC2BFA0BC | 0x437EA8 | 0x0BB22 |
| 69 | 0xC1B260F5 | 0x432158 | 0x0BA20 |
| 70 | 0xC0A6956E | 0x42C488 | 0x0B91E |
| 71 | 0xBF9C3C24 | 0x426838 | 0x0B81E |
| 72 | 0xBE935317 | 0x420C6A | 0x0B720 |
| 73 | 0xBD8BD84B | 0x41B118 | 0x0B624 |
| 74 | 0xBC85C9C5 | 0x415646 | 0x0B528 |
| 75 | 0xBB81258D | 0x40FBF2 | 0x0B42C |
| 76 | 0xBA7DE9AE | 0x40A21A | 0x0B334 |
| 77 | 0xB97C1437 | 0x4048BE | 0x0B23C |
| 78 | 0xB87BA337 | 0x3FEFDE | 0x0B146 |
| 79 | 0xB77C94C2 | 0x3F9778 | 0x0B050 |
| 80 | 0xB67EE6EE | 0x3F3F8C | 0x0AF5C |
| 81 | 0xB58297D3 | 0x3EE81C | 0x0AE6A |
| 82 | 0xB40AAEA2 | 0x7CCBB8 | 0x2B404 |
| 83 | 0xB21A31A6 | 0x7B7394 | 0x2AC90 |
| 84 | 0xB02F0DCB | 0x7A1F26 | 0x2A530 |
| 85 | 0xAE493452 | 0x78CE62 | 0x29DE4 |
| 86 | 0xAC6896A4 | 0x77813E | 0x296AC |
| 87 | 0xAA8D2652 | 0x7637B2 | 0x28F8C |
| 88 | 0xA8B6D516 | 0x74F1B2 | 0x2887C |
| 89 | 0xA6E594CF | 0x73AF34 | 0x28180 |
| 90 | 0xA5195786 | 0x727030 | 0x27A94 |
| 91 | 0xA3520F68 | 0x71349C | 0x273C0 |
| 92 | 0xA18FAECA | 0x6FFC70 | 0x26CFC |
| 93 | 0x9FD22825 | 0x6EC79E | 0x2664C |
| 94 | 0x9E196E18 | 0x6D9620 | 0x25FAC |
| 95 | 0x9C657368 | 0x6C67EE | 0x25924 |
| 96 | 0x9AB62AFC | 0x6B3CFC | 0x252A8 |
| 97 | 0x990B87E2 | 0x6A1544 | 0x24C40 |
| 98 | 0x97657D49 | 0x68F0BA | 0x245EC |
| 99 | 0x95C3FE86 | 0x67CF56 | 0x23FA4 |
| 100 | 0x9426FF0F | 0x66B112 | 0x23974 |
| 101 | 0x928E727D | 0x6595E2 | 0x23350 |
| 102 | 0x90FA4C8B | 0x647DC0 | 0x22D40 |
| 103 | 0x8F6A8117 | 0x6368A2 | 0x22740 |
| 104 | 0x8DDF0420 | 0x625680 | 0x2214C |
| 105 | 0x8C57C9C4 | 0x614752 | 0x21B70 |
| 106 | 0x8AD4C645 | 0x603B10 | 0x215A0 |
| 107 | 0x8955EE03 | 0x5F31B2 | 0x20FE0 |
| 108 | 0x87DB357F | 0x5E2B2E | 0x20A30 |
| 109 | 0x8664915B | 0x5D2780 | 0x20490 |
| 110 | 0x84F1F656 | 0x5C269E | 0x1FF00 |
| 111 | 0x8383594E | 0x5B2880 | 0x1F97C |
| 112 | 0x8218AF43 | 0x5A2D1E | 0x1F40C |
| 113 | 0x80B1ED4F | 0x593472 | 0x1EEA8 |
| 114 | 0x7E9F0606 | 0xAF894A | 0x79AC0 |
| 115 | 0x7BE86FB9 | 0xABC662 | 0x77108 |
| 116 | 0x7940BB9E | 0xA8181A | 0x74838 |
| 117 | 0x76A7980F | 0xA47E02 | 0x72048 |
| 118 | 0x741CB528 | 0xA0F7AE | 0x6F930 |
| 119 | 0x719FC4B9 | 0x9D84AE | 0x6D2F0 |
| 120 | 0x6F307A41 | 0x9A249C | 0x6AD80 |
| 121 | 0x6CCE8AE1 | 0x96D70C | 0x688E0 |
| 122 | 0x6A79AD55 | 0x939B9C | 0x66508 |
| 123 | 0x683199ED | 0x9071E6 | 0x641F0 |
| 124 | 0x65F60A7F | 0x8D598A | 0x61FA0 |
| 125 | 0x63C6BA64 | 0x8A5228 | 0x5FE08 |
| 126 | 0x61A3666D | 0x875B64 | 0x5DD28 |
| 127 | 0x5F8BCCDB | 0x8474E2 | 0x5BD00 |
| 128 | 0x5D7FAD59 | 0x819E48 | 0x59D80 |
| 129 | 0x5B7EC8F1 | 0x7ED742 | 0x57EB8 |
| 130 | 0x5988E209 | 0x7C1F76 | 0x56090 |
| 131 | 0x579DBC56 | 0x797694 | 0x54310 |
| 132 | 0x55BD1CDA | 0x76DC4A | 0x52630 |
| 133 | 0x53E6C9DA | 0x745046 | 0x509F8 |
| 134 | 0x521A8AD7 | 0x71D23A | 0x4EE50 |
| 135 | 0x50582888 | 0x6F61DC | 0x4D340 |
| 136 | 0x4E9F6CD3 | 0x6CFEDE | 0x4B8C8 |
| 137 | 0x4CF022C9 | 0x6AA8F6 | 0x49EE8 |
| 138 | 0x4B4A169B | 0x685FE0 | 0x48588 |
| 139 | 0x49AD1597 | 0x662352 | 0x46CC0 |
| 140 | 0x4818EE21 | 0x63F30A | 0x45478 |
| 141 | 0x468D6FAD | 0x610EC2 | 0x43CB8 |
| 142 | 0x450A6ABA | 0x5FB63C | 0x42578 |
| 143 | 0x438FB0CB | 0x5DA934 | 0x40EB8 |
| 144 | 0x421D1462 | 0x5BA76C | 0x3F878 |

TABLE 2-continued

| SL NO: | Y0i | S1i | S2i |
|---|---|---|---|
| 145 | 0x40B268FA | 0x59B0A6 | 0x3E2B0 |
| 146 | 0x3EA0ECB7 | 0xADA6CC | 0xF0BA0 |
| 147 | 0x3BF92E67 | 0xA64A10 | 0xE6860 |
| 148 | 0x396E41BA | 0x9F3D3C | 0xDCC00 |
| 149 | 0x36FEEDE6 | 0x987CEC | 0xD3640 |
| 150 | 0x34AA0764 | 0x9205E0 | 0xCA6E0 |
| 151 | 0x326E6F61 | 0x8BD504 | 0xC1D80 |
| 152 | 0x304B1332 | 0x85E754 | 0xB9A00 |
| 153 | 0x2E3EEBD2 | 0x803A00 | 0xB1C20 |
| 154 | 0x2C48FD60 | 0x7ACA48 | 0xAA380 |
| 155 | 0x2A6856AD | 0x759594 | 0xA3020 |
| 156 | 0x289C10C1 | 0x709960 | 0x9C180 |
| 157 | 0x26E34E6E | 0x6BD344 | 0x957A0 |
| 158 | 0x253D3BEA | 0x6740FC | 0x8F240 |
| 159 | 0x23A90E63 | 0x62E050 | 0x89120 |
| 160 | 0x222603A0 | 0x5EAF28 | 0x83420 |
| 161 | 0x20B361A6 | 0x5AAB7C | 0x7DB20 |
| 162 | 0x1F50765B | 0x56D364 | 0x785E0 |
| 163 | 0x1DFC9733 | 0x532508 | 0x73420 |
| 164 | 0x1CB720DD | 0x4F9E9C | 0x6E600 |
| 165 | 0x1B7F76F3 | 0x4C3E74 | 0x69B20 |
| 166 | 0x1A5503B2 | 0x4902F0 | 0x65360 |
| 167 | 0x193737B1 | 0x45EA80 | 0x60EC0 |
| 168 | 0x18258999 | 0x42F3AC | 0x5CD00 |
| 169 | 0x171F75E9 | 0x401D00 | 0x58E00 |
| 170 | 0x16247EB0 | 0x3D6524 | 0x551C0 |
| 171 | 0x15342B57 | 0x3ACAC8 | 0x51800 |
| 172 | 0x144E0860 | 0x384CB0 | 0x4E0C0 |
| 173 | 0x1371A737 | 0x35E9A4 | 0x4ABC0 |
| 174 | 0x129E9DF5 | 0x33A07C | 0x47920 |
| 175 | 0x11D48731 | 0x317028 | 0x44880 |
| 176 | 0x111301D0 | 0x2F5794 | 0x41A20 |
| 177 | 0x1059B0D3 | 0x2D55C0 | 0x3ED80 |
| 178 | 0x0F5257D1 | 0x54FA30 | 0xEB980 |
| 179 | 0x0E0CCDEF | 0x4DECA8 | 0xD8080 |
| 180 | 0x0CE248C1 | 0x477500 | 0xC6200 |
| 181 | 0x0BD08A3A | 0x4186C0 | 0xB5A80 |
| 182 | 0x0AD583EF | 0x3C1688 | 0xA6980 |
| 183 | 0x09EF5326 | 0x3719D8 | 0x98C00 |
| 184 | 0x091C3D37 | 0x328720 | 0x8C180 |
| 185 | 0x085AAC36 | 0x2E5590 | 0x80780 |
| 186 | 0x07A92BE9 | 0x2A7D18 | 0x75D00 |
| 187 | 0x070666F7 | 0x26F658 | 0x6C080 |
| 188 | 0x06712461 | 0x23BA80 | 0x63100 |
| 189 | 0x05E8451D | 0x20C360 | 0x5AD80 |
| 190 | 0x056AC1F7 | 0x1E0B40 | 0x53480 |
| 191 | 0x04F7A993 | 0x1B8CE8 | 0x4C600 |
| 192 | 0x048E1E9C | 0x194390 | 0x46080 |
| 193 | 0x042D561B | 0x172AC8 | 0x40380 |
| 194 | 0x03D495F4 | 0x153E88 | 0x3AE80 |
| 195 | 0x0383337C | 0x137B28 | 0x36000 |
| 196 | 0x03389230 | 0x11DD40 | 0x31880 |
| 197 | 0x02F4228E | 0x1061B0 | 0x2D680 |
| 198 | 0x02B560FC | 0x0F05A0 | 0x29A80 |
| 199 | 0x027BD4C9 | 0x0DC678 | 0x26300 |
| 200 | 0x02470F4E | 0x0CA1C8 | 0x23080 |
| 201 | 0x0216AB0E | 0x0B9560 | 0x20200 |
| 202 | 0x01EA4AFA | 0x0A9F48 | 0x1D700 |
| 203 | 0x01C199BE | 0x09BD98 | 0x1B000 |
| 204 | 0x019C4918 | 0x08EEA0 | 0x18C00 |
| 205 | 0x017A1147 | 0x0830D8 | 0x16B80 |
| 206 | 0x015AB07E | 0x0782D0 | 0x14D00 |
| 207 | 0x013DEA65 | 0x06E338 | 0x13180 |
| 208 | 0x012387A7 | 0x0650E0 | 0x11800 |
| 209 | 0x010B5587 | 0x05CAB0 | 0x10100 |
| 210 | 0x00EAC0C7 | 0x0A2D70 | 0x38600 |
| 211 | 0x0005672A | 0x088EF0 | 0x2F800 |
| 212 | 0x00A5FED7 | 0x073250 | 0x27E00 |
| 213 | 0x008B95C2 | 0x060D30 | 0x21800 |
| 214 | 0x00756063 | 0x0516C0 | 0x1C400 |
| 215 | 0x0062B395 | 0x044770 | 0x17C00 |
| 216 | 0x0052FF6B | 0x039930 | 0x14000 |
| 217 | 0x0045CAE1 | 0x0306A0 | 0x10C00 |
| 218 | 0x003AB032 | 0x028B60 | 0x0E200 |
| 219 | 0x003159CB | 0x0223C0 | 0x0BE00 |
| 220 | 0x00297FB6 | 0x01CC90 | 0x0A000 |
| 221 | 0x0022E570 | 0x018350 | 0x08600 |
| 222 | 0x001D5819 | 0x0145B0 | 0x07000 |
| 223 | 0x0018ACE5 | 0x0111E0 | 0x05E00 |
| 224 | 0x0014BFDB | 0x00E650 | 0x05000 |
| 225 | 0x001172B8 | 0x00C1A0 | 0x04400 |
| 226 | 0x000EAC0C | 0x00A2D0 | 0x03800 |
| 227 | 0x000C5673 | 0x0088F0 | 0x03000 |
| 228 | 0x000A5FED | 0x007320 | 0x02800 |
| 229 | 0x0008B95C | 0x0060D0 | 0x02200 |
| 230 | 0x00075606 | 0x005170 | 0x01C00 |
| 231 | 0x00062B39 | 0x004470 | 0x01800 |
| 232 | 0x00052FF7 | 0x003990 | 0x01400 |
| 233 | 0x00045CAE | 0x003070 | 0x01000 |
| 234 | 0x0003AB03 | 0x0028B0 | 0x00E00 |
| 235 | 0x0003159D | 0x002240 | 0x00C00 |
| 236 | 0x000297FB | 0x001CD0 | 0x00A00 |
| 237 | 0x00022E57 | 0x001830 | 0x00800 |
| 238 | 0x0001D582 | 0x001460 | 0x00800 |
| 239 | 0x00018ACE | 0x001120 | 0x00600 |
| 240 | 0x00014BFE | 0x000E60 | 0x00400 |
| 241 | 0x0001172C | 0x000C20 | 0x00400 |
| 242 | 0x00008000 | 0x002E80 | 0x08000 |
| 243 | 0x00002000 | 0x000B80 | 0x00000 |
| 244 | 0x00000800 | 0x000300 | 0x00000 |
| 245 | 0x00000200 | 0x000080 | 0x00000 |
| 246 | 0x00000080 | 0x000000 | 0x00000 |
| 247 | 0x00000020 | 0x000000 | 0x00000 |
| 248 | 0x00000008 | 0x000000 | 0x00000 |
| 249 | 0x00000002 | 0x000000 | 0x00000 |

LOG2F32 Table

| | | | |
|---|---|---|---|
| 1 | 0x01709C47 | 0xB7F26D | 0x2DCED |
| 2 | 0x044D8C46 | 0xB686CB | 0x2D1A7 |
| 3 | 0x0724D8EF | 0xB520BB | 0x2C6A2 |
| 4 | 0x09F6984A | 0xB3C01D | 0x2BBDE |
| 5 | 0x0CC2DFE2 | 0xB264D2 | 0x2B158 |
| 6 | 0x0F89C4C2 | 0xB10EBB | 0x2A70E |
| 7 | 0x124B5B7E | 0xAFBDBA | 0x29CFF |
| 8 | 0x1507B836 | 0xAE71B3 | 0x29328 |
| 9 | 0x17BEEE97 | 0xAD2A89 | 0x28989 |
| 10 | 0x1A7111DF | 0xABE821 | 0x2801F |
| 11 | 0x1D1E34E3 | 0xAAAA61 | 0x276E9 |
| 12 | 0x1FC66A0F | 0xA9712F | 0x26DE6 |
| 13 | 0x2269C369 | 0xA83C73 | 0x26513 |
| 14 | 0x25085296 | 0xA70C13 | 0x25C71 |
| 15 | 0x27A228DB | 0xA5DFFA | 0x253FD |
| 16 | 0x2A375721 | 0xA4B80F | 0x24BB6 |
| 17 | 0x2CC7EDF6 | 0xA3943C | 0x2439A |
| 18 | 0x2F53FD90 | 0xA2746D | 0x23BAA |
| 19 | 0x31DB95D0 | 0xA1588B | 0x233E3 |
| 20 | 0x345EC646 | 0xA04083 | 0x22C44 |
| 21 | 0x36DD9E2F | 0x9F2C40 | 0x224CD |
| 22 | 0x39582C79 | 0x9E1BB0 | 0x21D7B |
| 23 | 0x3BCE7FC7 | 0x9D0EBE | 0x2164F |
| 24 | 0x3E40A672 | 0x9C055A | 0x20F48 |
| 25 | 0x40AEAE89 | 0x9AFF71 | 0x20863 |
| 26 | 0x4318A5D5 | 0x99FCF1 | 0x201A1 |
| 27 | 0x457E99DB | 0x98FDCA | 0x1FB00 |
| 28 | 0x47E097DB | 0x9801EB | 0x1F480 |
| 29 | 0x4A3EACD7 | 0x970944 | 0x1EE20 |
| 30 | 0x4C98E58E | 0x9613C5 | 0x1E7DF |
| 31 | 0x4EEF4E83 | 0x95215F | 0x1E1BC |
| 32 | 0x5141F3FB | 0x943204 | 0x1DBB6 |
| 33 | 0x5390E204 | 0x9345A4 | 0x1D5CE |
| 34 | 0x55DC246D | 0x925C31 | 0x1D001 |
| 35 | 0x5823C6D1 | 0x91759E | 0x1CA4F |
| 36 | 0x5A67D492 | 0x9091DD | 0x1C4B9 |
| 37 | 0x5CA858DF | 0x8FB0E1 | 0x1BF3C |
| 38 | 0x5EE55EB1 | 0x8ED29D | 0x1B9D8 |
| 39 | 0x611EF0CF | 0x8DF705 | 0x1B48E |
| 40 | 0x635519CF | 0x8D1E0B | 0x1AF5B |
| 41 | 0x6587E415 | 0x8C47A5 | 0x1AA40 |
| 42 | 0x67B759D6 | 0x8B73C7 | 0x1A53D |
| 43 | 0x69E3851C | 0x8AA265 | 0x1A04F |
| 44 | 0x6C0C6FC0 | 0x89D373 | 0x19B78 |
| 45 | 0x6E322370 | 0x8906E9 | 0x196B6 |
| 46 | 0x7054A9B1 | 0x883CB9 | 0x1920A |
| 47 | 0x72740BDB | 0x8774DB | 0x18D71 |
| 48 | 0x74905320 | 0x86AF44 | 0x188ED |
| 49 | 0x76A98888 | 0x85EBEB | 0x1847D |

TABLE 2-continued

| SL NO: | Y0i | S1i | S2i |
|---|---|---|---|
| 50 | 0x78BFB4F4 | 0x852AC4 | 0x1801F |
| 51 | 0x7AD2E11F | 0x846BC8 | 0x17BD5 |
| 52 | 0x7CE3159F | 0x83AEED | 0x1779C |
| 53 | 0x7EF05AE4 | 0x82F429 | 0x17376 |
| 54 | 0x80FAB93C | 0x823B74 | 0x16F61 |
| 55 | 0x830238D0 | 0x8184C5 | 0x16B5D |
| 56 | 0x8506E1A8 | 0x80D014 | 0x1676A |
| 57 | 0x8708BBAA | 0x801D59 | 0x16387 |
| 58 | 0x8907CE9D | 0x7F6C8B | 0x15FB4 |
| 59 | 0x8B042225 | 0x7EBDA2 | 0x15BF1 |
| 60 | 0x8CFDBDC8 | 0x7E1096 | 0x1583E |
| 61 | 0x8EF4A8ED | 0x7D6561 | 0x15499 |
| 62 | 0x90E8EADE | 0x7CBBFB | 0x15103 |
| 63 | 0x92DA8AC6 | 0x7C145B | 0x14D7C |
| 64 | 0x94C98FB4 | 0x7B6E7C | 0x14A03 |
| 65 | 0x96B6009B | 0x7ACA56 | 0x14697 |
| 66 | 0x989FE451 | 0x7A27E2 | 0x14339 |
| 67 | 0x9A874193 | 0x79871A | 0x13FE9 |
| 68 | 0x9C6C1F01 | 0x78E7F7 | 0x13CA5 |
| 69 | 0x9E4E8325 | 0x784A73 | 0x1396E |
| 70 | 0xA02E746A | 0x77AE87 | 0x13644 |
| 71 | 0xA20BF926 | 0x77142D | 0x13325 |
| 72 | 0xA3E71797 | 0x767B60 | 0x13013 |
| 73 | 0xA5BFD5DF | 0x75E418 | 0x12D0C |
| 74 | 0xA7963A0D | 0x754E51 | 0x12A11 |
| 75 | 0xA96A4A17 | 0x74BA05 | 0x12722 |
| 76 | 0xAB3C0BDC | 0x74272E | 0x1243D |
| 77 | 0xAD0B8526 | 0x7395C6 | 0x12163 |
| 78 | 0xAED8BBA8 | 0x7305C9 | 0x11E94 |
| 79 | 0xB0A3B502 | 0x727731 | 0x11BCF |
| 80 | 0xB26C76BC | 0x71E9F8 | 0x11914 |
| 81 | 0xB433064B | 0x715E1A | 0x11664 |
| 82 | 0xB5F76913 | 0x70D393 | 0x113BD |
| 83 | 0xB7B9A45E | 0x704A5C | 0x11120 |
| 84 | 0xB979BD69 | 0x6FC271 | 0x10E8C |
| 85 | 0xBB37B959 | 0x6F3BCE | 0x10C02 |
| 86 | 0xBCF39D45 | 0x6EB66D | 0x10981 |
| 87 | 0xBEAD6E2D | 0x6E324B | 0x10709 |
| 88 | 0xC0653103 | 0x6DAF63 | 0x10499 |
| 89 | 0xC21AEAA6 | 0x6D2DB1 | 0x10232 |
| 90 | 0xC3CE9FE4 | 0x6CAD30 | 0x0FFD4 |
| 91 | 0xC5805579 | 0x6C2DDC | 0x0FD7E |
| 92 | 0xC7301011 | 0x6BAFB1 | 0x0FB30 |
| 93 | 0xC8DDD449 | 0x6B32AA | 0x0F8EA |
| 94 | 0xCA89A6AC | 0x6AB6C5 | 0x0F6AC |
| 95 | 0xCC338BB7 | 0x6A3BFD | 0x0F475 |
| 96 | 0xCDDB87D6 | 0x69C24F | 0x0F247 |
| 97 | 0xCF819F66 | 0x6949B5 | 0x0F01F |
| 98 | 0xD125D6B7 | 0x68D22E | 0x0EDFF |
| 99 | 0xD2C83209 | 0x685BB5 | 0x0EBE7 |
| 100 | 0xD468B58C | 0x67E646 | 0x0E9D5 |
| 101 | 0xD6076565 | 0x6771DF | 0x0E7CA |
| 102 | 0xD7A445A9 | 0x66FE7B | 0x0E5C6 |
| 103 | 0xD93F5A60 | 0x668C18 | 0x0E3C9 |
| 104 | 0xDAD8A784 | 0x661AB1 | 0x0E1D2 |
| 105 | 0xDC703104 | 0x65AA44 | 0x0DFE2 |
| 106 | 0xDE05FAC0 | 0x653ACE | 0x0DDF8 |
| 107 | 0xDF9A088A | 0x64CC4B | 0x0DC14 |
| 108 | 0xE12C5E2B | 0x645EB9 | 0x0DA37 |
| 109 | 0xE2BCFF5E | 0x63F213 | 0x0D85F |
| 110 | 0xE44BEFD0 | 0x638658 | 0x0D68E |
| 111 | 0xE5D93326 | 0x631B84 | 0x0D4C2 |
| 112 | 0xE764CCF7 | 0x62B195 | 0x0D2FC |
| 113 | 0xE8EEC0CE | 0x624887 | 0x0D13C |
| 114 | 0xEA77122B | 0x61E058 | 0x0CF82 |
| 115 | 0xEBFDC485 | 0x617904 | 0x0CDCC |
| 116 | 0xED82DB45 | 0x61128A | 0x0CC1D |
| 117 | 0xEF0659CC | 0x60ACE7 | 0x0CA72 |
| 118 | 0xF088436D | 0x604818 | 0x0C8CD |
| 119 | 0xF2089B75 | 0x5FE41A | 0x0C72C |
| 120 | 0xF3876524 | 0x5F80EA | 0x0C591 |
| 121 | 0xF504A3AF | 0x5F1E87 | 0x0C3FB |
| 122 | 0xF6805A44 | 0x5EBCEE | 0x0C26A |
| 123 | 0xF7FA8C05 | 0x5E5C1D | 0x0C0DD |
| 124 | 0xF9733C0C | 0x5DFC11 | 0x0BF55 |
| 125 | 0xFAEA6D67 | 0x5D9CC7 | 0x0BDD2 |
| 126 | 0xFC60231E | 0x5D3E3E | 0x0BC53 |
| 127 | 0xFDD4602E | 0x5CE073 | 0x0BAD9 |
| 128 | 0xFF47278B | 0x5C8364 | 0x0B964 |

Different tables can be employed for different example transcendental functions. One set of tables for a particular transcendental function can have a fixed distance between entry points of an input, and another set of tables for another transcendental function can have a variable distance between entry points of the input.

Figure 6:
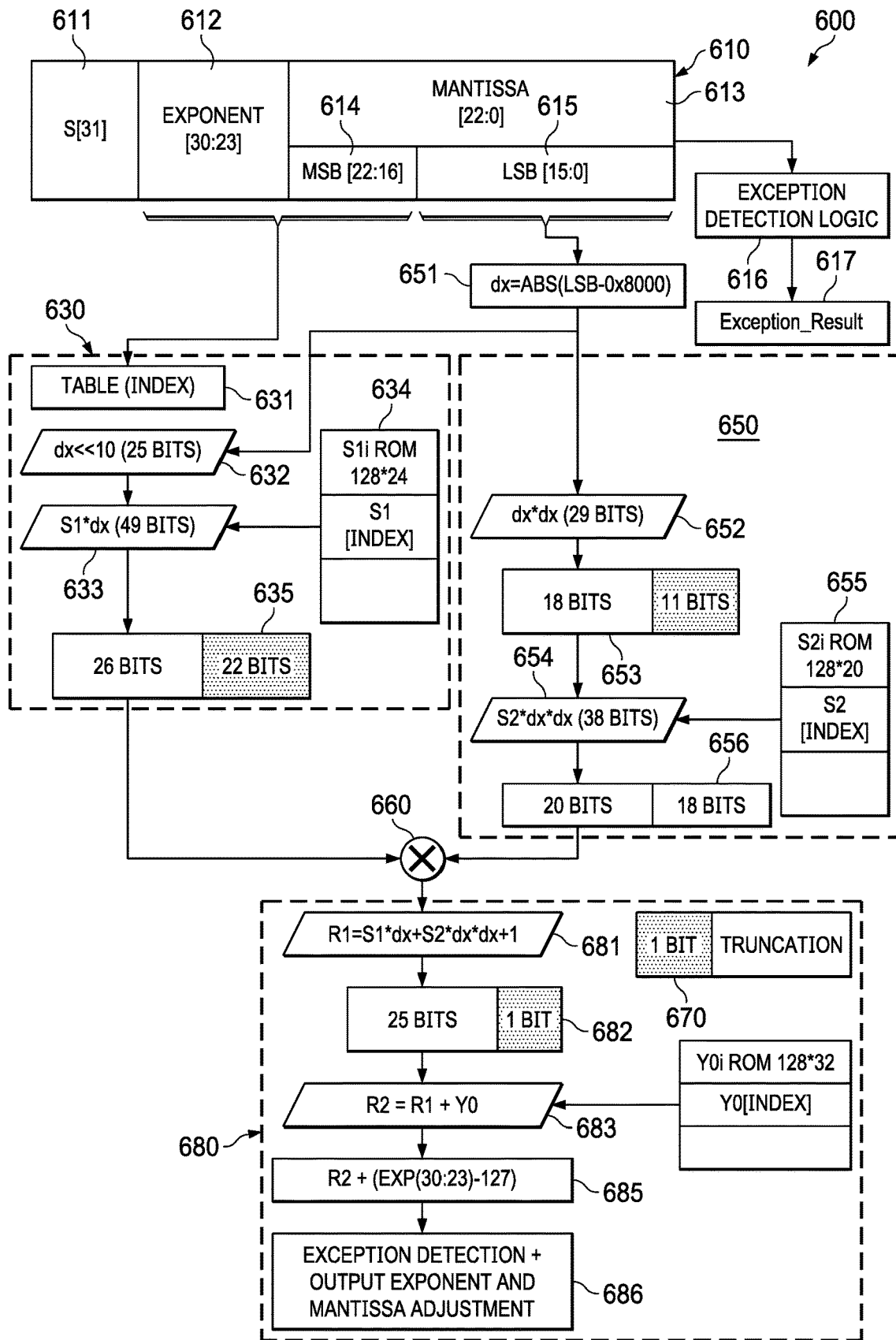
FIG. 6 is a block diagram of an example data path of an example logarithmic execution unit for determining logarithmic transcendental functions.

FIG. 6 is a block diagram of an example data path of an example logarithmic execution unit for determining logarithmic transcendental functions. For example, the logarithmic accelerator 600 is arranged to compute a result of a logarithmic function (e.g., $\log_2(x)$) in response to an input operand. The input operand is a floating-point number floating-point number in the form of a "1.M" form (where "M" is the mantissa) and having a value between 1 and 2.

The logarithmic accelerator 600 described herein is arranged to compute a floating point logarithm in response to curve-fitting including quadratic interpolation to generate the logarithmic result. The mantissa (e.g., for addressing a segment in the range [1.0, 2.0]) is represented by a number of equally spaced linear approximating segments. The coefficients for the curve fit can be derived using a least-mean-square approach.

In operation, the logarithmic accelerator 600 reads an input operand 610, where the input operand 610 includes a sign bit 611, exponent bits 612 and a mantissa 613. The mantissa 613 is segmented into most-significant bits (MSBs) 614 and least-significant bits (LSBs) 615. In the example, the input operand 610 includes 32 bits (e.g., as a range of [31:0]). The input operand 610 is parsed to detect any formatting errors by exception detection logic 616 and detected errors are reported as indicated by an error_result module 617.

Module 651 is arranged to generate a 15-bit number in response to the LSBs (e.g., 16 bits) 615 of the mantissa 613 of the input operand 610. For example, the module 651 is arranged to determine the absolute value of the result of subtracting the hexadecimal number 0x8000 from the LSBs 615. The output of the module 651 is used to, for example, interpolate values determined from the first table 634 and the second table 655 as described hereinbelow.

A first circuit 630 is arranged to generate a linear term of the logarithmic function in response to the LSBs 615 of the mantissa 613 of the input operand 610 and in response to a first table value S1 that is retrieved from a first table 634 in response to a first index Index1 generated in response to the MSBs 614 of the mantissa 613 of the input operand 610. As indicated by a module 632, the 15-bit output of the module 651 is left-shifted 10 times to produce a 25-bit number dx. The lowest seven bits of the bits [30:16] of the input operand can be selected for address the 128 entries of the LOG 2F32 table of Table 2, for example. (In various examples, the exponent only can be used to generate an index, although extra circuitry would otherwise be required to accommodate non-linearity in the logarithmic transfer function.) The notation dx<<10 represents a shift operation of 10 bits. As indicated by a module 633, the number dx is multiplied by the first table value S1 and the result is a 49-bit number S1*dx. The 49-bit number is truncated to a 26-bit number as indicated by module 635, with the least significant 22 bits being discarded. The 26 bit number or term S1*dx is presented to a combiner 660.

A second circuit 650 is arranged to generate a quadratic term of the logarithmic function in response to the LSBs 615 of the mantissa 613 of the input operand 610 and in response to a second table value S2 that is retrieved from a second table 655 in response to a second index Index2 generated in response to the MSBs 614 of the mantissa 613 of the input operand 610. The lowest seven bits of the bits [30:16] of the input operand can be selected for address the 128 entries of the LOG 2F32 table of Table 2, for example. As described hereinabove, the module 651 is arranged to generate a 15-bit number dx in response to the absolute value of the 16-bit LSB number 615 minus the hexadecimal number 0x8000. The number dx is squared to produce a 29-bit number dx*dx as indicated by a module 652.

The 29-bit number is truncated to an 18-bit number as indicated by module 653, with the least significant 11 bits being discarded (e.g., by truncation). As indicated by a module 654, the truncated 18-bit number dx*dx is multiplied by the second table value S2 and the result is a 38-bit number S2*dx*dx. The 38-bit number is truncated to a 20-bit number as indicated by module 656, with the least significant 18-bits being discarded. The 20-bit term S2*dx*dx is presented to the combiner 660.

A third circuit 680 is arranged to generate (e.g., to output) a constant term of the logarithmic function in response to the LSBs 615 of the mantissa 613 of the input operand 610 and in response to a third table value Y0 that is retrieved from a third table 684 in response to a third index Index3 generated in response to the MSBs 614 of the mantissa 613 of the input operand 610. The lowest seven bits of the bits [30:16] of the input operand can be selected for address the 128 entries of the LOG 2F32 table of Table 2, for example. As indicated by a module 681, the terms S1*dx, S2*dx*dx obtained from the combiner 660 and a rounding up constant 1 are added to produce a first result R1. The 26-bit result R1 is truncated to a 25-bit result R1 as indicated by modules 670, 682, with the least significant bit being discarded. As indicated by a module 683, the third table value Y0 is added to the 25 bit result R1 to produce a second result R2. The exponent bits 612 of the input operand 610 are added to the result R2 minus a number 127 as indicated by a module 685. The result R2 is the value of the logarithmic function of the input operand 610. Accordingly, the third circuit 680 is arranged to generate a mantissa of an output operand (the result R2) in response to a sum of the linear term, the quadratic term, and the constant term (in possible results, any of the linear term, the quadratic term, and the constant terms can have a value of zero). Additionally, exception detection logic and output exponent and mantissa adjustment is performed as indicated by a module 686 on the result R2 to identify data failures.

Figure 7:
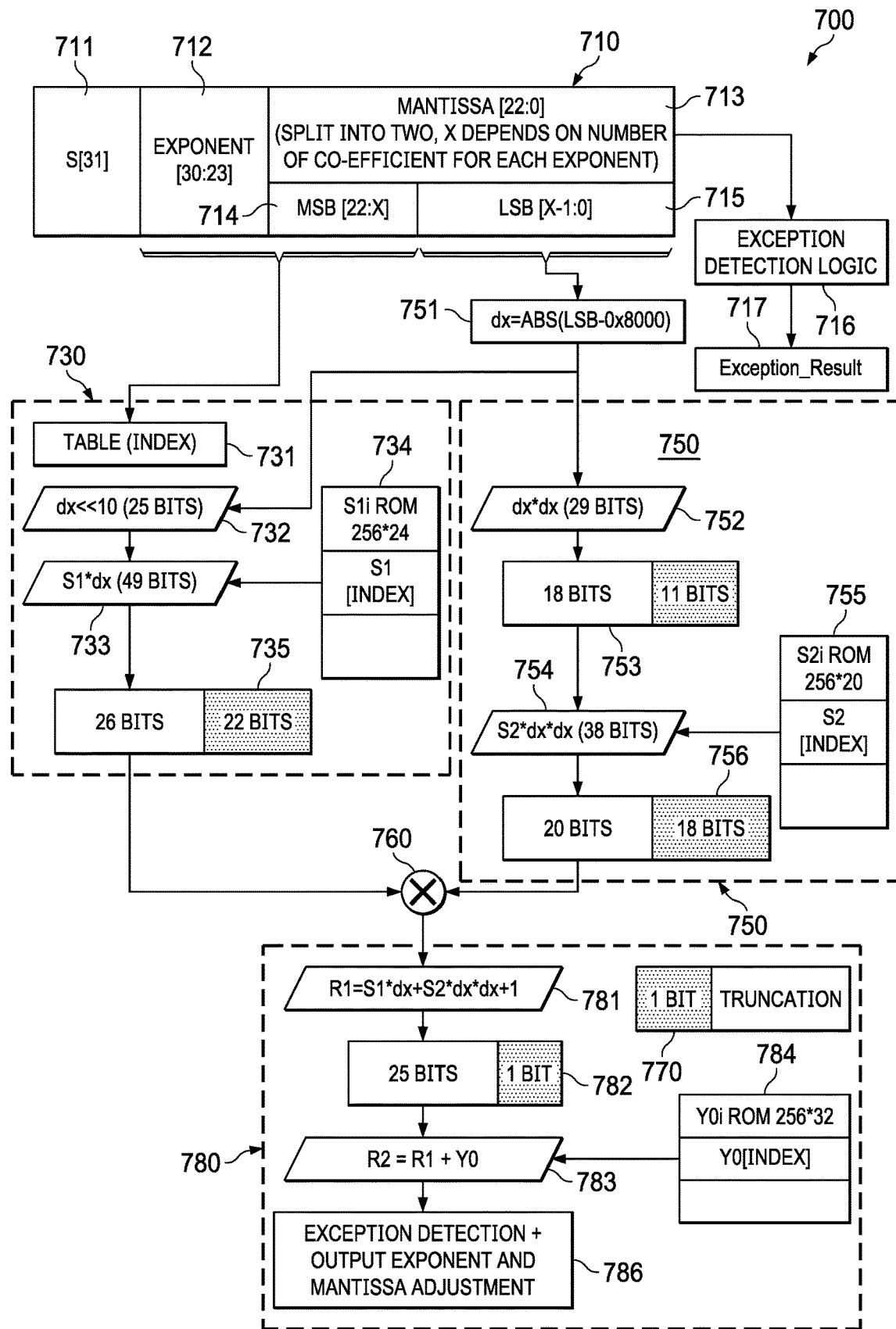
FIG. 7 is a block diagram of an example data path of an example exponentiation execution unit for determining exponential transcendental functions.

FIG. 7 is a block diagram of an example data path of an example exponentiation execution unit for determining exponentiation transcendental functions. For example, the exponentiation accelerator 700 is arranged to compute a result of an exponential function (e.g., $2^{-|x|}$) in response to an input operand. The exponentiation accelerator 700 described herein is arranged to compute a floating point exponential in response to curve-fitting including quadratic interpolation to generate the exponential result. The floating point number is represented by a number of non-equally spaced linear approximating segments. The non-equally spaced segments (e.g., slices) are addressed by the mantissa and exponent of the input operand for approximating a value of the transcendental function. The tables for evaluation of the exponential function are different from the tables employed for evaluation of the logarithmic function.

In operation, the exponentiation accelerator 700 reads an input operand 710 into the logarithmic accelerator 700, where the input operand 710 includes a sign bit, 711, exponent bits 712 and a mantissa 713. The mantissa 713 is segmented into most-significant bits (MSBs) 714 and least-significant bits (LSBs) 715 (e.g., where X can be any value from 22 to 1). In the example, the input operand 710 includes 32 bits (e.g., as a range of [31:0]). The input operand 710 is evaluated to detect any exception conditions (e.g., infinity, NaN (not a number), and Denormal) by exception detection logic 716 and detected errors are reported as indicated by an error_result module 717.

Module 751 is arranged to generate a 15-bit number in response to the LSBs (e.g., 16 bits) 715 of the mantissa 713 of the input operand 710. For example, the module 751 is arranged to determine the absolute value of the result of subtracting the hexadecimal number 0x8000 from the LSBs 715. The output of the module 751 is used to, for example, interpolate values determined from the first table 734 and the second table 755 as described hereinbelow.

A first circuit 730 is arranged to generate a linear term of the exponential function in response to the LSBs 715 of the mantissa 713 of the input operand 710 and in response to a first table value S1 that is retrieved from a first table 734 in response to a first index Index1 generated in response to the MSBs 714 of the mantissa 713 as well as the exponent (bits 30:23 of the exponent) 712. The lowest eight bits of the bits [30:16] of the input operand can be selected for address the 249 entries of the IEXP2F32 table of Table 2, for example. As indicated by a module 732, the LSBs 715 of the mantissa 713 are left-shifted 10 bits to produce a 25-bit number dx. (The notation dx<<10 represents a shift operation by 10 bits.) As indicated by a module 733, the number dx is multiplied by the first table value S1 and the result is a 49-bit number S1*dx. The 49-bit number is truncated to a 26-bit number as indicated by module 735, with the least significant 22 bits being discarded. The 26-bit term S1*dx is presented to a combiner 760.

A second circuit 750 is arranged to generate a quadratic term of the exponential function in response to the LSBs 715 of the mantissa 713 of the input operand 710 and in response to a second table value S2 that is retrieved from a second table 755 in response to a second index Index2 generated in response to the MSBs 714 of the mantissa 713 as well as the exponent 712. The lowest eight bits of the bits [30:16] of the input operand can be selected for address the 249 entries of the IEXP2F32 table of Table 2, for example. As described hereinabove, the module 751 is arranged to generate a 15-bit number dx in response to the absolute value of the 16-bit LSB number minus the hexadecimal number 0x8000. The number dx is squared to produce a 29-bit number dx*dx as indicated by a module 752.

The 29-bit number is truncated to an 18-bit number as indicated by module 753, with the least significant 11 bits being discarded. As indicated by a module 754, the truncated 18-bit number dx*dx is multiplied by the second table value S2 and the result is a 38-bit number S2*dx*dx. The 38-bit number is truncated to a 20-bit number as indicated by module 756, with the least significant 18 bits being discarded. The 20-bit term S2*dx*dx is presented to the combiner 760.

A third circuit 780 is arranged to generate a constant term of the exponential function in response to the LSBs 715 of the mantissa 713 of the input operand 710 and in response to a third table value Y0 that is retrieved from a third table 784 in response to a third index Index3 generated in response to the MSBs 714 of the mantissa 713 as well as the exponent 712. The lowest eight bits of the bits [30:16] of the input operand can be selected for address the 249 entries of the IEXP2F32 table of Table 2, for example. As indicated by a module 781, the terms S1*dx, S2*dx*dx obtained from the combiner 760 and a rounding up constant 1 are added to produce a first result R1. The 26-bit result R1 is truncated to a 25-bit result R1 as indicated by modules 770, 782, with the least significant bit being discarded. As indicated by a module 783, the third table value Y0 is added to the 25-bit result R1 to produce a result R2. The result R2 is the value of the exponential function of the input operand 710. Accordingly, the third circuit 780 is arranged to generate a mantissa of an output operand (the result R2) in response to a sum of the linear term, the quadratic term, and the constant term. Additionally, exception detection logic and output exponent and mantissa adjustment is performed as indicated by a module 786 on the result R2 to identify data failures.

With continuing reference to the preceding figures, a process and related method of operating an apparatus to compute a value of a transcendental function have been introduced herein. In one embodiment, the method includes generating a linear term of a transcendental function in response to least significant bits of a mantissa of an input operand and in response to a first table value that is retrieved from a first table in response to a first index generated in response to most significant bits of the mantissa of the input operand. The method also includes generating a quadratic term for the transcendental function in response to least significant bits of the mantissa of the input operand and in response to a second table value that is retrieved from a second table in response to a second index generated in response to most significant bits of the mantissa of the input operand. The method further includes generating a constant term for the transcendental function in response to least significant bits of the mantissa of the input operand and in response to a third table value that is retrieved from a third table in response to a third index generated in response to most significant bits of the mantissa of the input operand. The method also includes generating an output operand in response to a sum of the linear term, the quadratic term, and the constant term and/or approximations thereof.

In an embodiment, the transcendental function is an exponential function, wherein the first index is further generated in response to exponent of the input operand and MSBs of mantissa, wherein the second index is further generated in response to the exponent and MSB of mantissa of the input operand, and wherein the third index is further generated in response to the exponent and MSBs of mantissa of the input operand.

In an embodiment, the output operand for the transcendental function is generated in response to quadratic approximations of the linear term, the quadratic term, and the constant term, and wherein the quadratic approximations of the linear term, the quadratic term, and the constant terms are respectively generated in response to the first circuit, the second circuit, and the third circuit are arranged to truncate and discard lower order bits to produce, respectively the linear term, the quadratic term, and the constant term Modifications are possible in the described examples, and other examples are possible, within the scope of the claims.

What is claimed is:

1. An apparatus, comprising:
a first circuit arranged to generate a linear term of a transcendental function in response to a set of least significant bits of an input operand and in response to a first table value that is retrieved from a first table in response to a first index generated in response to a set of most significant bits of the input operand;
a second circuit arranged to generate a quadratic term for the transcendental function in response to the set of least significant bits of the input operand and in response to a second table value that is retrieved from a second table in response to a second index generated in response to the set of most significant bits of the input operand; and
a third circuit arranged to generate a constant term for the transcendental function in response to the set of least significant bits of the input operand and in response to a third table value that is retrieved from a third table in response to a third index generated in response to the set of most significant bits of the input operand, and wherein the third circuit is arranged to generate an output operand in response to a sum of the linear term, the quadratic term, and the constant term.

2. The apparatus of claim 1, wherein the first circuit and the second circuit are arranged as parallel branches of a hardware pipeline to respectively generate the linear term and the quadratic term in parallel.

3. The apparatus of claim 1, wherein the third circuit is programmable to generate the output operand as either a logarithmic result or an exponentiated result in response to a command generated by an external processor.

4. The apparatus of claim 1, wherein the first table, the second table and the third table are different tables.

5. The apparatus of claim 1, wherein the output operand for the transcendental function is generated in response to quadratic approximations formed with the linear term, the quadratic term, and the constant term.

6. The apparatus of claim 1, wherein the third circuit is arranged to selectively generate the output operand as a result as one of an exponential function and a logarithmic function.

7. The apparatus of claim 1, wherein the transcendental function is an exponential function, wherein the first index is further generated in response to an exponent of the input operand, wherein the second index is further generated in response to the exponent of the input operand, and wherein the third index is further generated in response to the exponent of the input operand.

8. The apparatus of claim 1, wherein the output operand for the transcendental function is generated in response to quadratic approximations of the linear term, the quadratic term, and the constant term, and wherein the quadratic approximations of the linear term, the quadratic term, and the constant term are respectively generated in response to the first circuit, the second circuit, and the third circuit are arranged to truncate and discard lower order bits to produce, respectively the linear term, the quadratic term, and the constant term.

9. The apparatus of claim 1, wherein the apparatus comprises an execution unit configured to receive the input operand from registers of a floating point unit (FPU).

10. The apparatus of claim 9, wherein the execution unit is configured to write the output operand into the registers of the FPU.

11. The apparatus of claim 1, wherein the output operand is arranged to provide an input signal to a system to be controlled, and the input operand is responsive to a difference between an output state of the system to be controlled and a target state of the system to be controlled.

12. The apparatus of claim 1, wherein the first table value retrieved from the first table in response to the first index, the second table value retrieved from the second table in response to the second index, and the third table value retrieved from the third table in response to the third index are produced from one of a sequence of non-equally spaced segments addressed by an mantissa and exponent of the input operand for an approximation of a value of the transcendental function.

13. A system, comprising:
a processor arranged to generate an input operand for hardware accelerated calculation of a transcendental function;
a memory configured to receive and store the input operand; and
an execution unit arranged to generate as an approximation of a transcendental function in response to the input operand stored and retrieved from the memory, comprising:
a first circuit arranged to generate a linear term of the transcendental function in response to a set of least significant bits of a mantissa of the input operand and in response to a first table value that is retrieved from a first table in response to a first index generated in response to a set of most significant bits of the mantissa of the input operand;
a second circuit arranged to generate a quadratic term for the transcendental function in response to the set of least significant bits of the mantissa of the input operand and in response to a second table value that is retrieved from a second table in response to a second index generated in response to the set of most significant bits of the mantissa of the input operand; and
a third circuit arranged to generate a constant term for the transcendental function in response to a third table value that is retrieved from a third table in response to a third index generated in response to the set of most significant bits of the mantissa of the input operand, and wherein the third circuit is arranged to generate an output operand in response to a sum of the linear term, the quadratic term, and the constant term.

14. The system of claim 13, wherein the output operand for the transcendental function is generated in response to quadratic approximations formed with the linear term, the quadratic term, and the constant term.

15. The system of claim 13, wherein the transcendental function is an exponential function, wherein the first index is further generated in response to the set of least significant bits of an exponent of the input operand, wherein the second index is further generated in response to the set of least significant bits of the exponent of the input operand, and wherein the third index is further generated in response to the set of least significant bits of the exponent of the input operand.

16. The system of claim 13, wherein the output operand for the transcendental function is generated in response to quadratic approximations of the linear term, the quadratic term, and the constant term, and wherein the quadratic approximations of the linear term, the quadratic term, and the constant term are respectively generated in response to the first circuit, the second circuit, and the third circuit are arranged to truncate and discard lower order bits to produce, respectively the linear term, the quadratic term, and the constant term.

17. A method, comprising:
generating, by a first circuit of a first pipeline stage, a linear term of a transcendental function in response to a set of least significant bits of an input operand and in response to a first table value that is retrieved from a first table in response to a first index generated in response to a set of most significant bits of the input operand;
generating, by a second circuit of the first pipeline stage, a quadratic term for the transcendental function in response to the set of least significant bits of the input operand and in response to a second table value that is retrieved from a second table in response to a second index generated in response to the set of most significant bits of the input operand;
generating, by a third circuit of a second pipeline stage that follows the first pipeline stage, a constant term for the transcendental function in response to the set of least significant bits of the input operand and in response to a third table value that is retrieved from a third table in response to a third index generated in response to the set of most significant bits of the input operand; and
generating, by a fourth circuit of the second pipeline stage, an output operand in response to a sum of the linear term, the quadratic term, and the constant term.

18. The method of claim 17, wherein the output operand for the transcendental function is generated in response to quadratic approximations formed with the linear term, the quadratic term, and the constant term.

19. The method of claim 17, wherein the transcendental function is an exponential function, wherein the first index is further generated in response to an exponent of the input operand, wherein the second index is further generated in response to the exponent of the input operand, and wherein the third index is further generated in response to the exponent of the input operand.

20. The method of claim 17, wherein the output operand for the transcendental function is generated in response to quadratic approximations of the linear term, the quadratic term, and the constant term, and wherein the quadratic approximations of the linear term, the quadratic term, and the constant term are respectively generated by the first circuit, the second circuit, and the third circuit truncating and discarding lower order bits to produce, respectively the linear term, the quadratic term, and the constant term.

* * * * *